United States Patent [19]

Hanson et al.

[11] Patent Number: 4,499,916
[45] Date of Patent: Feb. 19, 1985

[54] VACUUM CHECK VALVE

[75] Inventors: John D. Hanson, Mississauga; John E. Cook, Chatham, both of Canada

[73] Assignee: Allied Corporation, Morristown, N.J.

[21] Appl. No.: 462,180

[22] Filed: Jan. 31, 1983

[51] Int. Cl.³ ............................................. F02P 5/10
[52] U.S. Cl. .............................. 137/103; 137/DIG. 8
[58] Field of Search ............... 137/103, 102, DIG. 8; 123/407; 60/290

[56] References Cited

U.S. PATENT DOCUMENTS

| 3,941,149 | 3/1976 | Mittleman | 137/493.1 |
| 3,955,364 | 5/1976 | Lewis | 60/290 |
| 3,982,555 | 9/1976 | Aubel et al. | 137/103 |
| 4,033,125 | 7/1977 | Inada et al. | 60/290 |
| 4,054,152 | 10/1977 | Ito et al. | 137/512 |
| 4,084,606 | 4/1978 | Mittleman | 137/102 |
| 4,166,476 | 9/1979 | Yamanaka et al. | 137/103 |
| 4,241,751 | 12/1980 | Nonoyama et al. | 137/103 |
| 4,355,653 | 10/1982 | Credle, Jr. | 137/102 |
| 4,391,294 | 7/1983 | Aubel | 137/493.8 |

Primary Examiner—Martin P. Schwadron
Assistant Examiner—James R. Shay
Attorney, Agent, or Firm—R. C. Wells

[57] ABSTRACT

A vacuum check valve comprising a single umbrella valve responding to vacuum differences between the input and output of the check valve. The check valve directs the output line to feed a vacuum operated device with either the vacuum source or reference air through a bleed passage. The umbrella shaped valve eliminates the requirement for a diaphragm operated poppet valve.

3 Claims, 4 Drawing Figures

U.S. Patent  Feb. 19, 1985  4,499,916
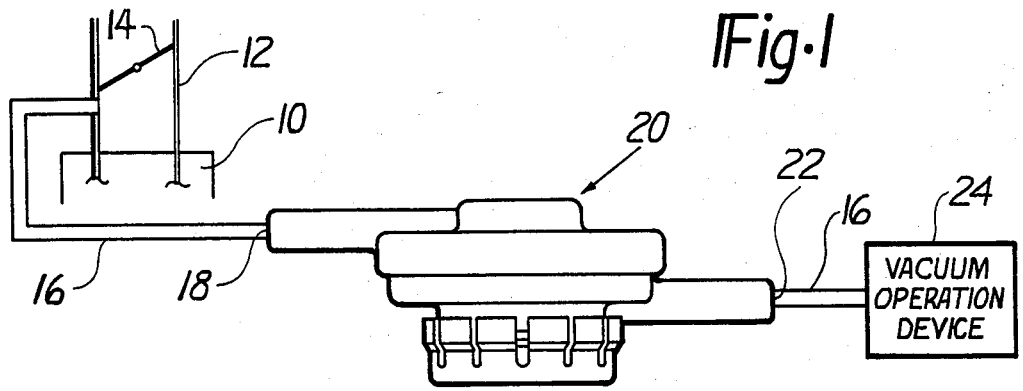
Fig. 1
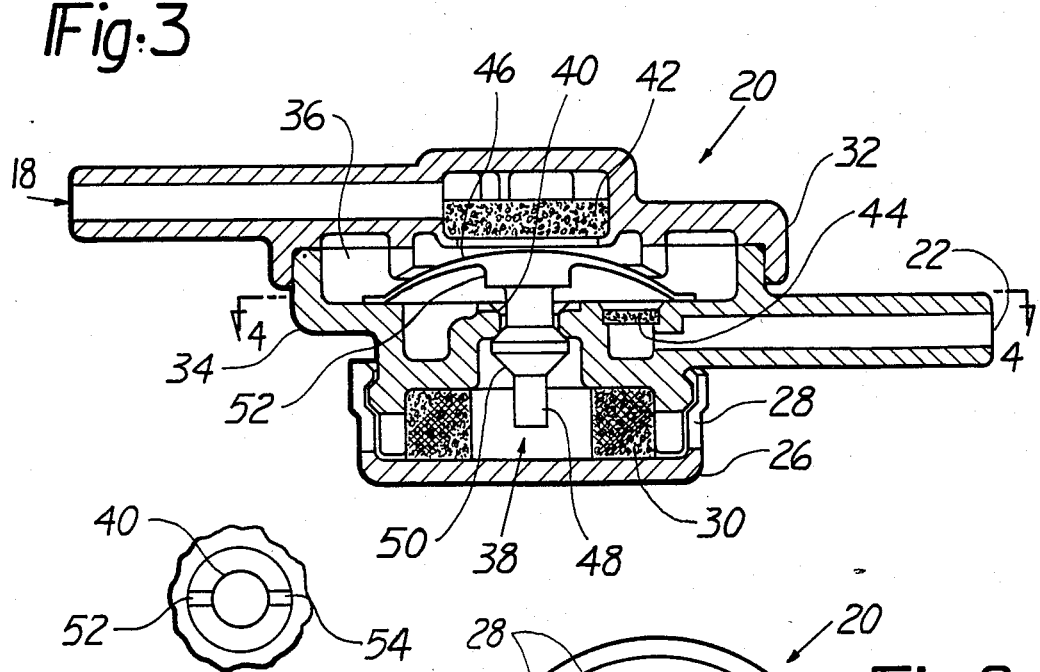
Fig. 3
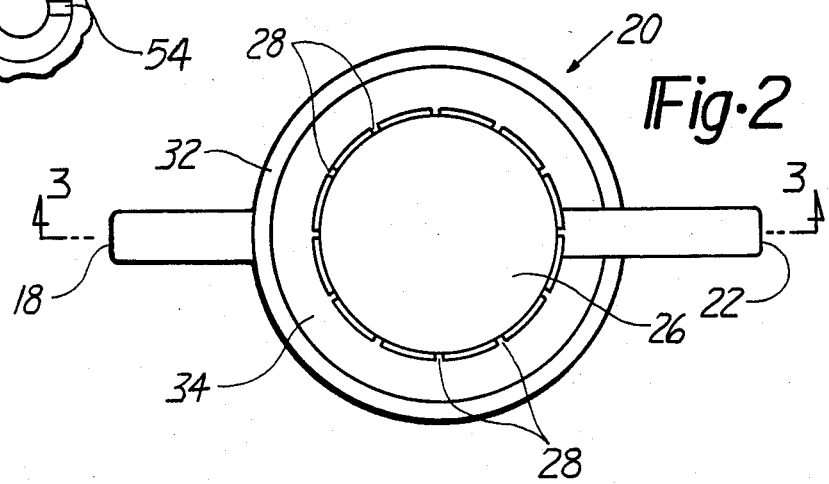
Fig. 4
Fig. 2

VACUUM CHECK VALVE

This invention relates to vacuum valves in general and more particularly to a vacuum check valve with fluid bleed to a reference pressure.

BACKGROUND OF THE INVENTION

In emission control systems of modern internal combustion engines, there are many devices which are operated by vacuum created in the intake manifold. The connection for the vacuum source for such devices is typically taken from one of several locations downstream of the throttle valve in the throttle body. In this source of engine manifold vacuum, there is a high concentration of fuel vapors and other contaminants which are detrimental to the rubber and plastic parts commonly used in vacuum operated devices.

The invention disclosed herein is intended to be used in the vacuum line between the vacuum source and vacuum operated devices to assure that vapors and contaminants never reach the vacuum operated devices.

A similar, more complicated vacuum relay valve for isolating a vacuum operated device from a contaminated vacuum signal source is described in U.S. Pat. No. 3,982,555 issed to Aubel et al and entitled "Vacuum Relay Valve". The valve therein contains both a diaphragm operated poppet valve to open a bleed source to atmospheric pressure and an umbrella valve responsive to vacuum difference between the input and output of the relay valve.

The vacuum check valve of the present invention comprises a single umbrella valve responding to vacuum differences between the input and output of the check valve to direct the output line to feed the vacuum source or to receive reference air through a bleed passage and there is no diaphragm operated poppet valve.

These and other advantages of the invention will become more apparent upon reference to the following detailed description and drawings.

DESCRIPTION OF THE DRAWINGS

In the drawings:

FIG. 1 is a schematic view of vacuum system employing the device;

FIG. 2 is a plan view of the vacuum check valve of the present invention;

FIG. 3 is a sectional view taken along lines 3—3 of FIG. 2; and

FIG. 4 is a partial sectional view taken along lines 4—4 in FIG. 3.

DETAILED DESCRIPTION OF THE DRAWINGS

Referring to the FIGURES by the reference characters, there is illustrated in FIG. 1 a schematic view of a vacuum operated control system as may be used on an internal combustion engine as found in a motor vehicle. The source of the vacuum is the intake manifold 10, as shown in FIG. 1, and the vacuum is taken from a throttle body 12 having a rotatable throttle valve 14 controlling the fuel/air mixture flowing into the intake manifold 10. Extending away from the throttle body 12 is a vacuum line 16 which is connected to the input 18 of the vacuum check valve 20 of the present invention. Connected to the output 22 of the vacuum check valve 20 is a vacuum operated device 24 which may be an emission control device or any vacuum operated control valve typically found in a motor vehicle. In the orientation shown in FIG. 1, a reference pressure is supplied to the bottom of the vacuum check valve 20 which reference pressure is typically atmospheric pressure and will be used as hereinafter described.

In FIG. 1, the source of vacuum is intake manifold vacuum and is taken from the throttle body 12 below the throttle blade 14 and will, during idle or deceleration operations, be at a high vacuum due to the operation of the engine. However, at wide open throttle or heavy load conditions, the vacuum at that point is much less and close to atmospheric pressure due to the fact that the throttle blade is wide open. The vacuum is drawn off the throttle body 12 through a vacuum line 16 to a vacuum operated device 24. It is the purpose of the vacuum check valve 20 to prevent the flow of vapors or other contaminants from the manifold 10 to the vacuum operated device 24.

In operation of the system of FIG. 1, without the vacuum check valve 20, when the internal combustion engine which is not shown is operated in a high speed or heavy load operation, the vacuum in the throttle body 12 is greatly reduced and the flow of air and contaminants is from the throttle body 12 or source to the vacuum operated device 24. With the vacuum check valve 20 positioned as shown, fluid or air flow will not be from the vacuum source to the vacuum operated device 24.

Referring to FIG. 2, there is shown a bottom plan view of the vacuum check valve 20 of the present invention. This view illustrates a plastic cap 26 which is snapped on to the lower portion of the valve 20. The cap 26 contains a plurality of openings 28 around its periphery, or in the alternative, in the bottom of the cap 26 to allow a reference pressure, which is typically atmospheric pressure, to be supplied to the valve 20. The cap 26, as shown in FIG. 3 holds or retains a second filter 30 in the valve 20 to remove all foreign particles from the reference pressure. The body or housing of the valve 20 of the present invention is typically formed from two or more molded plastic members 32 and 34 and as shown comprise an upper 32 and a lower 34 member which together form the housing. The cap 26 is snapped on the lower member 34 of the valve 20.

Referring to FIG. 3, which is a cross-sectional view of the valve 20 illustrating the several elements of the valve, the housing of the valve 20 forms two chambers 36 and 38 interconnected through an orifice 40. The input port 18 of the check valve 20 is connected through a first filter 42 to the first chamber 36 and is adapted to be connected to the source of the vacuum which, in FIG. 1, is in the throttle body 12 of the engine. The output port 22 of the valve 20 is connected through a third filter 44 to the same chamber 36 of the valve 20. The output port 22 is connected from the valve 20 to one or more vacuum operated devices 24 in the system. The function of the third filter 44 is to remove contaminants in the air from the device 24 to keep the inner surfaces in the chamber 36 clean to prevent fouling of the valve operation.

Positioned in the orifice 40 between the two chambers 36 and 38 of the check valve 20 is an umbrella valve which has an umbrella-shaped top 46 and an elongated stem 48 axially extending from the underside thereof. The elongated stem 48 extends through the orifice 40 into the second chamber 38 in the valve 20. As previously indicated, the second chamber 38 is enclosed by the cap 26. The openings of the cap 28 supply air to the valve 20 through the second filter 30 to remove and clean the air before it reaches the orifice 40. The stem 48 of the umbrella valve extends through the orifice 40 and has on the bottom side of the orifice 40, as shown in FIG. 3, an orifice closing member 50 which operates to seal the orifice 40 in the second chamber 38. The umbrella-shaped top 46 extends over the third filter 44 in the output port 22 of the valve 20 and effectively, under certain conditions, closes the output port 22 from any effects of the input port 18.

Referring to FIG. 4, two bleed passages 54 are shown connecting the volume under the umbrella-shaped top 46 of the umbrella valve and the output port 22 to the orifice 40 when the umbrella valve is closed. As illustrated in FIG. 3, the umbrella valve has a large circular surface 52 connected to the underside thereof, which seals the top of the orifice 40 under certain operating conditions which will hereinafter be explained.

The vacuum check valve 20 controls the flow of fluid, and in particular air, between the input 18 and the output 22 ports. When there is a high vacuum at the input port 18 of the check valve 20, the vacuum operated device 24 operates to evacuate the air pressure therein by having air flow through the output port 22 of the check valve 20, the third filter 44 and into the volume under the umbrella-shaped top 46 of the umbrella valve. Since there is a high vacuum at the input port 18, the umbrella-shaped top 46 lifts off the inner surface of the check valve 20 and allows the air to flow around the umbrella-shaped top 46 through the first filter 42 in the input port 18 to the vacuum source in the manifold 10. Without the valve 20 and during wide open throttle when the vacuum at the input port 18 is low and the vacuum in the vacuum operating device 24 is high, there would be actual air flowing from the input port 18 to the vacuum operated device 24. The air flow from the throttle body 12 generally contains gasoline vapors and other contaminants which are detrimental to the materials from which the vacuum operated devices 24 are fabricated. For this reason, the check valve 20 is inserted in the vacuum line 16.

Wher there is low vacuum at the source 10 and high vacuum at the device 24, the umbrella-shaped top collapses or flattens sealing its edges against the inner surface of the first chamber 36 of the valve 20 adjacent the orifice 40 and the large circular surface 52 seals the top of the orifice 40. If the third filter 44 did not remove contaminants from the air flowing from the device, such contaminants would foul the valve and prevent the umbrella-shaped top 46 from sealing. When the umbrella valve seals, the stem 48 moves causing the orifice closing member 50 to move away from the bottom of the orifice 40 allowing the orifice to be opened to the reference pressure. However, with the circular surface 52 of the umbrella valve flattened against the orifice 40, only the bleed passages 54 allow air to flow in the orifice 40 between the output port 22 and the second chamber 38 of the valve 20. Depending upon the relative pressures in the vacuum operated device 24 and the reference pressure, air will flow in a direction from high pressure to low pressure or typically from the second chamber 38 to the vacuum operated device 24. This flow of air will operate to purge the vacuum system and reduce the vacuum in the vacuum operated device 24 to a low vacuum or to atmospheric pressure. By sizing the bleed passages 54 this decay of vacuum in the vacuum operated device 24 will take place over a controlled period of time.

As illustrated in FIG. 4, the pair of bleed passages 54 are positioned adjacent the orifice 40. However the size and number of bleed pressure 54 depends upon the speed of decay desired and the capacity of the vacuum to be reduced in the vacuum operated device 24.

Although an embodiment of the invention has been shown and described, various modifications and substitutions may be made by those skilled in the art without departing from the spirit and scope of the invention.

What is claimed is:

1. A vacuum check valve for use in a vacuum operated system for preventing the flow of air contaminates and vapors from a vacuum source to vacuum operated devices, the check valve comprising:
   a housing with a first and second chamber therein;
   an orifice interconnecting said first and second chamber;
   an input port connected to said first chamber and adapted to receive the vacuum source;
   an output port from said first chamber and adapted to be connected to the vacuum operated devices, said output port spaced from said input port;
   a reference pressure source input connected to said second chamber;
   a unitary umbrella valve in said orifice having
      an umbrella-shaped top surface overlying both said orifice and said output port,
      an elongated stem axially aligned from the underside of said umbrella-shaped top surface and extending through said orifice and into said second chamber;
      an orifice closing member positioned on said stem and spaced from said umbrella-shaped top surface and being operable when the vacuum at said output port is equal to or less than the vacuum at said input port for closing said orifice from said reference pressure source allowing the flow of air only from said output port to said input port, and
      a circular member connected on the underside of said umbrella-shaped top surface for sealing said orifice only when the vacuum at said output port is greater than the vacuum at said input port; and
   at least one bleed passage under said circular member and extending from said orifice for allowing the flow of air only between said output port and said reference pressure source input when the vacuum at said output port is greater than the vacuum at said input port.

2. A vacuum check valve according to claim 1 wherein said orifice closing member operates to close said orifice to any flow of air between said reference pressure source and any one of said input and output ports when the pressure at said input and output ports is equal.

3. A vacuum check valve connected between a manifold source of variable vacuum and a vacuum operated device for preventing the flow of gasoline vapors and contaminants from the manifold to the vacuum operated device, the valve comprising:
   a housing having an input port adapted to be connected to a source of manifold vacuum, an output port adapted to be connected to a vacuum operated device and a reference pressure port, and
   a unitary molded valve responding to the relative vacuum levels between said inputs port and said output port for closing said reference pressure port and connecting said output port to the input port when the vacuum at said input port is greater than the vacuum at said output port, for closing both said output port and said reference pressure port when the vacuum levels are equal and for connecting said reference pressure port to said output port equalizing the pressure level between the output port and the input port when the vacuum level at the input port is less than the vacuum at the output port.

* * * * *